United States Patent
Kamiya et al.

(10) Patent No.: US 10,693,163 B2
(45) Date of Patent: Jun. 23, 2020

(54) FUEL CELL SYSTEM AND VEHICLE

(71) Applicant: TOYOTA JIDOSHA KABUSHIKI KAISHA, Toyota-shi, Aichi-ken (JP)

(72) Inventors: Akihiro Kamiya, Nisshin (JP); Yutaka Tano, Toyota (JP); Takahiro Umehara, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 9 days.

(21) Appl. No.: 16/222,209

(22) Filed: Dec. 17, 2018

(65) Prior Publication Data

US 2019/0198894 A1 Jun. 27, 2019

(30) Foreign Application Priority Data

Dec. 25, 2017 (JP) ................. 2017-247322

(51) Int. Cl.
*H01M 8/1011* (2016.01)
*H01M 8/04858* (2016.01)
*B60L 58/30* (2019.01)
*B60L 50/70* (2019.01)
*B60L 50/72* (2019.01)
(Continued)

(52) U.S. Cl.
CPC .......... *H01M 8/0488* (2013.01); *B60L 50/51* (2019.02); *B60L 50/70* (2019.02); *B60L 50/72* (2019.02); *B60L 58/30* (2019.02); *H01M 8/04559* (2013.01); *H02P 27/06* (2013.01); *B60L 2210/14* (2013.01); *B60L 2210/40* (2013.01); *B60L 2260/42* (2013.01); *H01M 2250/20* (2013.01); *H02P 2201/09* (2013.01)

(58) Field of Classification Search
CPC ......... H01M 8/04179; H01M 8/04104; H01M 8/04559; H01M 8/04388; H01M 8/04365; H01M 8/04194; H01M 8/1011
See application file for complete search history.

(56) References Cited

U.S. PATENT DOCUMENTS 5,650,239 A * 7/1997 Lex ................. H01M 10/44
429/101
8,247,122 B2 * 8/2012 Okamoto .......... H01M 8/04179
429/430
(Continued)

FOREIGN PATENT DOCUMENTS

JP 2009-158399 7/2009

*Primary Examiner* — Rina I Duda
(74) *Attorney, Agent, or Firm* — Finnegan, Henderson, Farabow, Garrett & Dunner, LLP

(57) ABSTRACT

A fuel cell system includes a control section that: transmits a first current command value used to lower an output voltage of a fuel cell stack to a fuel cell converter when the output voltage becomes equal to or higher than a first voltage; transmits a second current command value used to boost the output voltage to the fuel cell converter when the output voltage becomes equal to or lower than a second voltage; stores the first current command value as a first storage value when the output voltage becomes equal to or lower than the second voltage; stores the second current command value as a second storage value when the output voltage becomes equal to or higher than the first voltage; and transmits a current command value that falls between the first storage value and the second storage value to the fuel cell converter.

5 Claims, 6 Drawing Sheets

(51) Int. Cl.
*B60L 50/51* (2019.01)
*H01M 8/04537* (2016.01)
*H02P 27/06* (2006.01)

(56) References Cited

U.S. PATENT DOCUMENTS

| | | | |
|---|---|---|---|
| 9,570,753 B2* | 2/2017 | Dennis | H02J 1/10 |
| 2009/0110968 A1* | 4/2009 | Ulrike | H01M 8/04194 |
| | | | 429/404 |
| 2010/0273075 A1 | 10/2010 | Imanishi et al. | |
| 2016/0156049 A1* | 6/2016 | Ha | H01M 8/04798 |
| | | | 429/431 |

* cited by examiner

FUEL CELL SYSTEM AND VEHICLE

INCORPORATION BY REFERENCE

The disclosure of Japanese Patent Application No. 2017-247322 filed on Dec. 25, 2017 including the specification, drawings and abstract is incorporated herein by reference in its entirety.

BACKGROUND

1. Technical Field

The disclosure relates to a fuel cell system and a vehicle.

2. Description of Related Art

A fuel cell (a fuel-cell stack) generates electricity in accordance with an operating condition that is based on supply amounts of fuel gas and oxidation gas (air). A relationship between an output voltage and an output current (a V-I characteristic) of the fuel cell differs by such an operating condition. A fuel cell converter that controls output of the fuel cell controls where to set an operating point of the fuel cell that generates the electricity under a specified operating condition. In Japanese Patent Application Publication No. 2009-158399 (JP 2009-158399 A), as one type of such control, voltage control in the case where a cell voltage of the fuel cell is lowered for rapid warm-up is disclosed.

SUMMARY

Meanwhile, an appropriate voltage range within which the cell is not deteriorated, that is, an upper limit value and a lower limit value exist for the output voltage of the fuel cell. Accordingly, in the case where an amount of the current obtained from the fuel cell is changed, it is necessary to control the voltage such that the output voltage of the fuel cell neither exceeds the upper limit value nor falls below the lower limit value. However, in the case where the fuel cell converter controls the amount of the current on its own such that the output voltage of the fuel cell falls within the appropriate range, there is a possibility that a request for a vehicle as a whole cannot be fulfilled. Accordingly, in the case where the amount of the current obtained from the fuel cell is regulated to make the output voltage of the fuel cell fall within the appropriate range, an integrated control section instructs the fuel cell converter on the amount of the current to be increased or reduced while executing control of the entire vehicle such as obtaining a short amount of the current from a secondary battery or storing an excess amount of the current to the secondary battery. It was found that, in the case where such control was executed to make the output voltage of the fuel cell fall within the appropriate range, the appropriate amount of the current to be increased or reduced could not be obtained depending on the operating point of the fuel cell, and, as a result, the operation of the fuel cell became unstable. As one example of a case where the operation of the fuel cell becomes unstable, the output voltage of the fuel cell oscillates between the upper limit value and the lower limit value and thus is not stabilized.

In an example shown in FIG. 6, in the case where the output voltage of the fuel cell once exceeds a first voltage while an output request current command value Ca1 for the fuel cell remains constant, the integrated control section makes a correction to gradually increase the output request current command value Ca1 by ΔCa until the output voltage becomes equal to or lower than the first voltage. Meanwhile, once the output voltage of the fuel cell falls below a second voltage, the integrated control section gradually reduces a post-correction current command value by ΔCa until the output voltage becomes equal to or higher than the second voltage. However, the fuel cell is a system having a response delay. Accordingly, even when the above-described current correction is made, the output voltage of the fuel cell oscillates beyond the voltage range between the first voltage and the second voltage. In addition, the post-correction current command value repeats the gradual increase and the gradual reduction.

(1) A fuel cell system in an aspect of the disclosure includes: a fuel cell stack; a voltage detector that detects an output voltage of the fuel cell stack; a fuel cell converter that regulates the output voltage; and a control section that is configured to: transmit a first current command value used to lower the output voltage to the fuel cell converter in the case where the output voltage becomes equal to or higher than a first voltage that is an upper limit of the output voltage range; transmit a second current command value used to boost the output voltage to the fuel cell converter in the case where the output voltage becomes equal to or lower than a second voltage that is a lower limit of the output voltage range; store the first current command value as a first storage value in the case where the output voltage becomes equal to or lower than the second voltage; store the second current command value as a second storage value in the case where the output voltage becomes equal to or higher than the first voltage; and transmit the current command value as the first current command value or the second current command value to the fuel cell converter, the current command value being calculated by using the first storage value and the second storage value and falling between the first storage value and the second storage value. According to this fuel cell system, every time the output voltage of the fuel cell stack becomes equal to or higher than the first voltage or becomes equal to or lower than the second voltage, the control section updates the first storage value or the second storage value and transmits the current command value, which is calculated by using the first storage value and the second storage value, as the first current command value or the second current command value to the fuel cell converter. In this way, the control section controls the regulation of the output voltage of the fuel cell stack by the fuel cell converter. Therefore, hunting of the output voltage can be suppressed.

(2) The control section may be further configured to: transmit a value that is obtained by adding a predetermined fixed value to an output request current command value corresponding to an output request for the fuel cell stack as the first current command value to the fuel cell converter and store the first current command value as the first storage value in the case where the first storage value is not stored in advance and the output voltage becomes equal to or higher than the first voltage; and transmit the output request current command value as the second current command value to the fuel cell converter and store the second current command value as the second storage value in the case where the second storage value is not stored in advance and the output voltage becomes equal to or lower than the second voltage. According to this fuel cell system, in the case where the first storage value and the second storage value are not stored in advance, the first storage value to be stored and the second storage value to be stored can be determined.

(3) The control section may be further configured to transmit a last transmitted current command value to the fuel cell converter in the case where the output voltage is lower than the first voltage and higher than the second voltage. According to this fuel cell system, in the case where the output voltage is lower than the first voltage and higher than the second voltage, the current command value to be transmitted can be determined.

(4) The current command value that falls between the first storage value and the second storage value may be an average value between the first storage value and the second storage value. According to this fuel cell system, the current command value that falls between the first storage value and the second storage value can be calculated.

The disclosure can also be realized in various aspects other than the above aspect. For example, the disclosure can be realized in an aspect of a vehicle that includes the fuel cell system and a motor that drives the vehicle, the motor rotating by electricity generated by the fuel cell stack.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
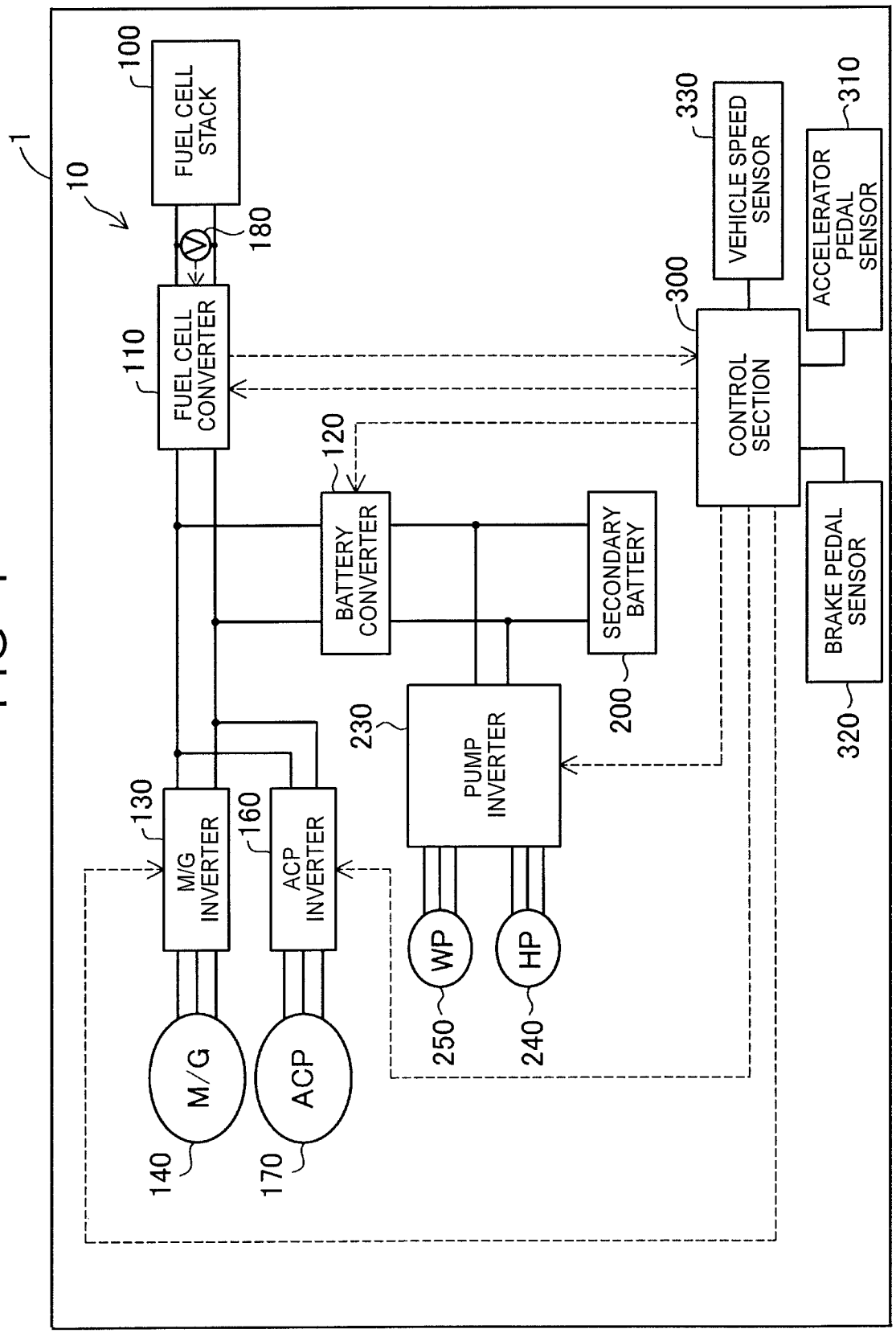
FIG. 1 is a schematic configuration diagram of an electric system of a fuel cell system in an embodiment.

FIG. 1 is a schematic configuration diagram of an electric system of a fuel cell system 10 in an embodiment of the disclosure. The fuel cell system 10 is mounted on a vehicle 1, and outputs electricity as a power source of the vehicle 1 in response to a request from a driver.

The fuel cell system 10 includes a fuel cell stack 100, a voltage detector 180, a fuel cell converter 110, a battery converter 120, a motor generator (M/G) inverter 130, a motor generator (M/G) 140, an air compressor (ACP) inverter 160, an air compressor (ACP) 170, a secondary, battery 200, a pump inverter 230, a hydrogen pump (HP) 240, a coolant pump (WP) 250, a control section 300, an accelerator pedal sensor 310, a brake pedal sensor 320, and a vehicle speed sensor 330.

As the fuel cell stack 100, solid polymer fuel cells, each of which generates the electricity by an electrochemical reaction between fuel gas and oxidation gas, can be adopted, for example. As the fuel gas, hydrogen can be adopted, for example. As the oxidation gas, air can be adopted, for example. The fuel cell stack 100 is configured by stacking plural single cells, which are not shown.

The voltage detector 180 detects an output voltage of the fuel cell stack 100. The fuel cell converter 110 is a DC/DC converter that regulates the output voltage of the fuel cell stack 100. The regulation of the output voltage of the fuel cell stack 100 by the fuel cell converter 110 is controlled by a current command value that is transmitted from the control section 300. In addition, the fuel cell converter 110 boosts the output voltage of the fuel cell stack 100 to a high voltage that can be used by the motor generator 140.

The motor generator inverter 130 converts a DC voltage regulated by the fuel cell converter 110 to an AC voltage, regulates a frequency and a magnitude of the AC voltage in accordance with a control signal from the control section 300 to supply the AC voltage to the motor generator 140, and controls the motor generator 140. The motor generator 140 has a function of a motor to rotate for driving the vehicle by using the electricity and a function as a generator that generates regenerative electricity. The air compressor inverter 160 converts the DC voltage regulated by the fuel cell converter 110 to the AC voltage, regulates a frequency and a magnitude of the AC voltage in accordance with a control signal from the control section 300 to supply the AC voltage to the air compressor 170, and controls the air compressor 170.

The battery converter 120 is a bidirectional DC/DC converter. That is, the battery converter 120 lowers the DC voltage regulated by the fuel cell converter 110 or boosts a voltage of the secondary battery 200 in accordance with a control signal from the control section 300. The secondary battery 200 functions as a power supply of the motor generator 140, the air compressor 170, the hydrogen pump 240, the coolant pump 250, and the like. In the secondary battery 200, the electricity from the fuel cell stack 100 and the regenerative electricity from the motor generator 140 are stored. As the secondary battery 200, a lithium-ion secondary battery, a nickel-metal hydride secondary battery, or the like can be adopted, for example.

The pump inverter 230 converts the voltage of the secondary battery 200 or the DC voltage lowered by the battery converter 120 to the AC voltage, regulates a frequency and a magnitude of the AC voltage in accordance with a control signal from the control section 300 to supply the AC voltage to the hydrogen pump 240 and the coolant pump 250, and controls the hydrogen pump 240 and the coolant pump 250.

The control section 300 is constructed of a microcomputer that includes a central processing unit and a main storage unit. The control section 300 is an integrated ECU including a fuel cell ECU, a fuel cell converter ECU, an electricity control ECU, or the like, which are not shown. The fuel cell ECU, the fuel cell converter ECU, and the electricity control ECU are mutually communicable. The accelerator pedal sensor 310, the brake pedal sensor 320, and the vehicle speed sensor 330 are connected to the control section 300. The accelerator pedal sensor 310 detects a depression amount of an accelerator pedal (not shown) in the vehicle 1, the brake pedal sensor 320 detects a depression amount of a brake pedal (not shown) in the vehicle 1, and the vehicle speed sensor 330 detects a vehicle speed of the vehicle 1. The control section 300 controls an operation of each section in the fuel cell system 10 in accordance with a detection signal from each of these sensors. In addition, the control section 300 obtains the output voltage of the fuel cell stack 100, which is detected by the voltage detector 180, via the fuel cell converter 110. In FIG. 1, a signal path between each of the sections in the fuel cell system 10 and the control section 300 is indicated by a broken line.

The control section 300 transmits the current command value to the fuel cell converter 110 and thereby controls the regulation of the output voltage of the fuel cell stack 100 by the fuel cell converter 110. More specifically, the control section 300 first transmits an output request current command value to the fuel cell converter 110. The output request current command value corresponds to the detection signal from the accelerator pedal sensor 310 and an output request for the fuel cell stack 100. The fuel cell converter 110 regulates the output voltage of the fuel cell stack 100 in accordance with the output request current command value. Next, the control section 300 transmits a current command value (hereinafter referred to as a "post-correction current command value") that is obtained by correcting the output request current command value in accordance with the regulated output voltage to the fuel cell converter 110. The fuel cell converter 110 regulates the output voltage of the fuel cell stack 100 in accordance with the post-correction current command value. Note that values including zero can be used for the correction of the output request current command value.

Here, when the output voltage of the fuel cell stack 100 deviates from a predetermined output voltage range of the fuel cell stack 100, the control section 300 controls the regulation of the output voltage of the fuel cell stack 100 by the fuel cell converter 110 as follows. When the output voltage of the fuel cell stack 100 becomes equal to or higher than a first voltage as an upper limit of the output voltage range, the control section 300 transmits a first current command value (the post-correction current command value) for lowering the output voltage to the fuel cell converter 110. Meanwhile, when the output voltage of the fuel cell stack 100 becomes equal to or lower than a second voltage as a lower limit of the output voltage range, the control section 300 transmits a second current command value (the post-correction current command value) for boosting the output voltage to the fuel cell converter 110. Here, when the output voltage of the fuel cell stack 100 becomes equal to or loWer than the second voltage, the control section 300 stores the first current command value as a first storage value. When the output voltage of the fuel cell stack 100 becomes equal to or higher than the first voltage, the control section 300 stores the second current command value as a second storage value. Then, the control section 300 calculates the current command value that falls between the first storage value and the second storage value by using the first storage value and the second storage value. Finally, the control section 300 transmits the calculated current command value as first current command value or the second current command value to the fuel cell converter 110. Note that each of the "first current command value" and the "second current command value" may be referred to as the "post-correction current command value".

The "predetermined output voltage range" is a permissible voltage range of an arbitrary target voltage, for example, a high potential avoidance voltage. The high potential avoidance voltage is set to avoid the open circuit voltage and thus is lower than an open circuit voltage. The "first storage value" and the "second storage value" are current values that are used to calculate the current command value falling between the first storage value and the second storage value. As the current command value falling between the first storage value and the second storage value, for example, an average value between the first storage value and the second storage value can be adopted. This average value may be an arithmetic mean, a geometric mean, or a weighted mean.

Figure 2:
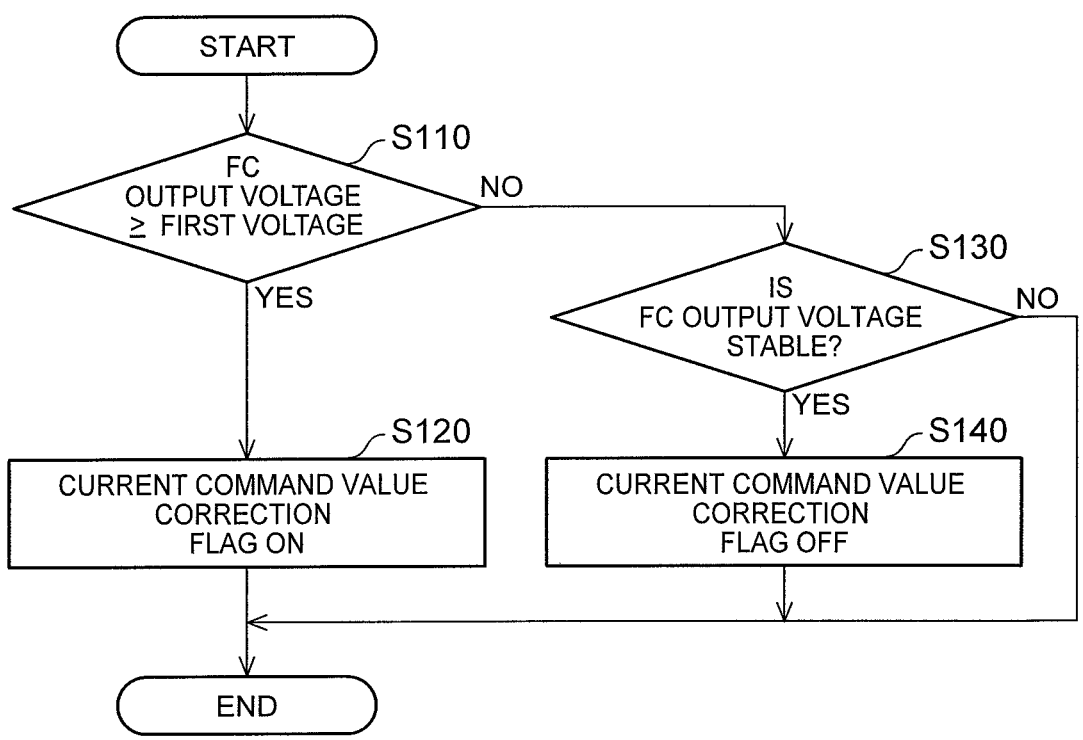
FIG. 2 is an exemplified flowchart that determines turning on/off of a current command value correction flag.
Figure 3:
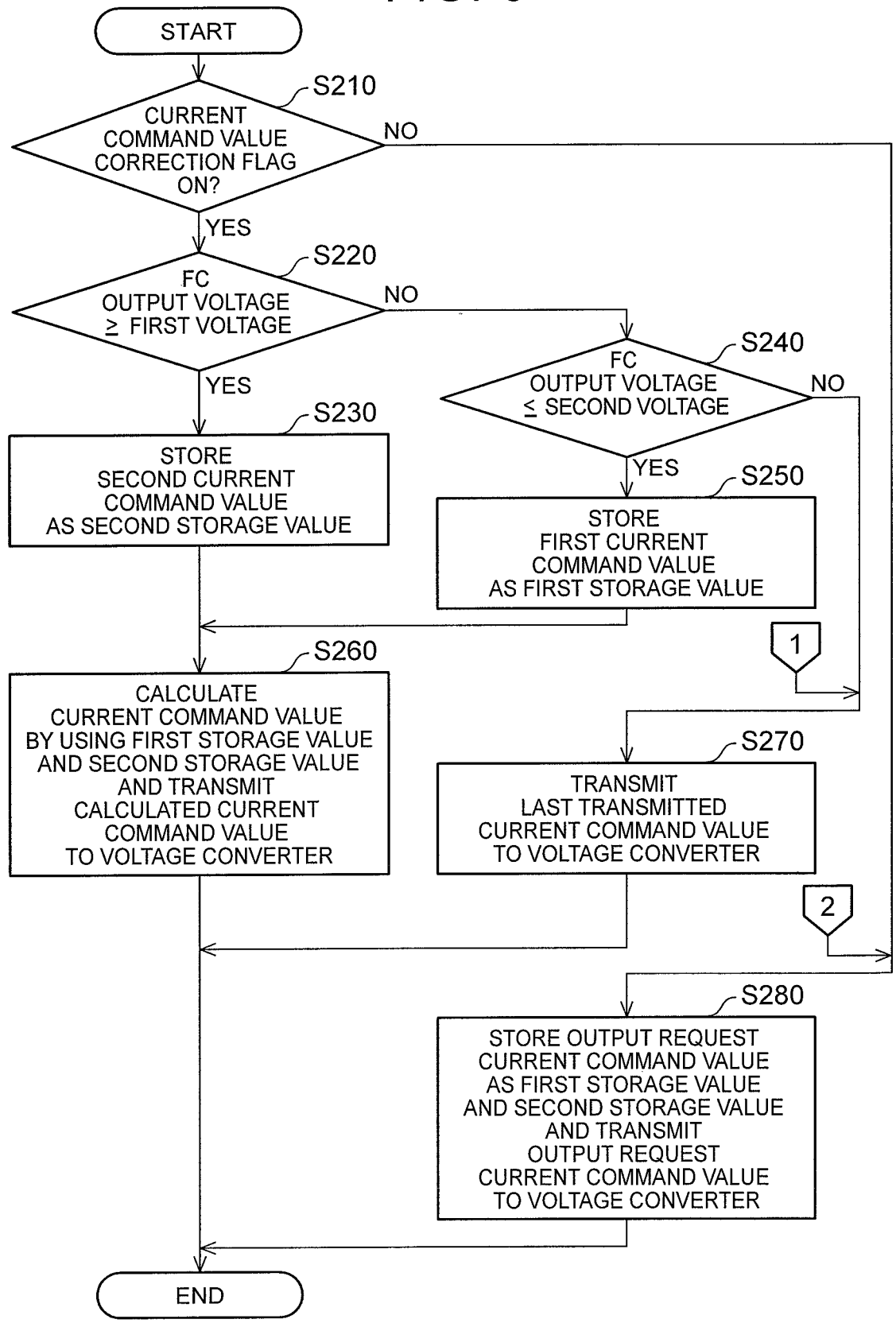
FIG. 3 is an exemplified flowchart that illustrates details of output request current command value correction processing.

FIG. 2 is a flowchart that exemplifies correction determination processing to determine turning on/off of a current command value correction flag. The current command value correction flag is a flag used to determine whether to correct the output request current command value. FIG. 3 is a flowchart that exemplifies details of current command value correction processing. The processing shown in FIG. 2 and FIG. 3 is repeatedly executed by the control section 300 during an operation of the fuel cell system 10.

In FIG. 2, in step S110, the control section 300 determines whether the output voltage of the fuel cell stack 100 is equal to or higher than the first voltage. If the control section 300 determines that the output voltage of the fuel cell stack 100 is equal to or higher than the first voltage (Yes in step S110), the processing proceeds to step S120. Then, the control section 300 sets the current command value correction flag to be on and terminates the correction determination processing. On the other hand, if the control section 300 determines that the output voltage of the fuel cell stack 100 is lower than the first voltage (No in step S110), the processing proceeds to step S130. In step S130, the control section 300 determines whether the output voltage of the fuel cell stack 100 is stable. If the control section 300 determines that the output voltage of the fuel cell stack 100 is stable (Yes in step S130), the processing proceeds to step S140. Then, the control section 300 sets the current command value correction flag to be off and terminates the correction determination processing. On the other hand, if the control section 300 determines that the output voltage of the fuel cell stack 100 is not stable (No in step S130), the control section 300 terminates the correction determination processing without changing on/off of the current command value correction flag. Note that, instead of the procedure shown in FIG. 2, the correction determination processing may be performed by another procedure.

In FIG. 3, in step S210, the control section 300 determines whether the current command value correction flag is on. If the current command value correction flag is on (Yes in step S210), the processing proceeds to step S220. In step S220, the control section 300 determines whether the output voltage of the fuel cell stack 100 is equal to or higher than the first voltage. If the control section 300 determines that the output voltage is equal to or higher than the first voltage (Yes in step S220), the processing proceeds to step S230. In step S230, the control section 300 stores the second current command value as the second storage value. Here, a value that differs from the first storage value may be stored in advance as an initial value of the second storage value. As this initial value, the current command value that corresponds to the second voltage may be adopted. In step S260, the control section 300 calculates the current command value that falls between the first storage value and the second storage value by using the first storage value and the second storage value, and transmits the calculated current command value as the first current command value to the fuel cell converter 110. In the case where step S250 is executed before step S260, the first storage value that is stored in step S250 is used as the first storage value. On the other hand, in the case where step S250 is not executed before step S260, an initial value of the first storage value, which will be described below, may be used.

In step S210, if the current command value correction flag is off in step S210 (No in step S210), the processing proceeds to step S280. In step S280, the control section 300 stores the output request current command value as the first storage value and the second storage value and transmits the output request current command value to the fuel cell converter 110. Note that step S210 and step S280 may be eliminated.

If the control section 300 determines that the output voltage of the fuel cell stack 100 is lower than the first voltage in step S220 (No in step S220), the processing proceeds to step S240. In step S240, the control section 300 determines whether the output voltage of the fuel cell stack 100 is equal to or lower than the second voltage. If the control section 300 determines that the output voltage is equal to or lower than the second voltage (Yes in step S240), the processing proceeds to step S250. In step S250, the control section 300 stores the first current command value as the first storage value. Here, a value that differs from the second storage value may be stored in advance as the initial value of the first storage value. As this initial value, the current command value that corresponds to the first voltage may be adopted. After the control section 300 executes step S250, the processing proceeds to step S260. In the case where step S230 is executed before step S260, the first storage value that is stored in step S230 is used as the second storage value. On the other hand, in the case where step S230 is not executed before step S260, the initial value of the second storage value may be used. Note that, as the initial value of the first storage value and the initial value of the second storage value, the two current command values that significantly differ from each other are preferably adopted in consideration of various operating conditions of the fuel cell system 10.

In step S240, if the control section 300 determines that the output voltage of the fuel cell stack 100 is lower than the first voltage and higher than the second voltage (No in step S240), the processing proceeds to step S270. In step S270, the control section 300 transmits the last transmitted current command value to the fuel cell converter 110. The "last transmitted current command value" is the last current command value that has been transmitted before the current command value is transmitted in step S270. Note that step S270 may be eliminated.

Figure 4:
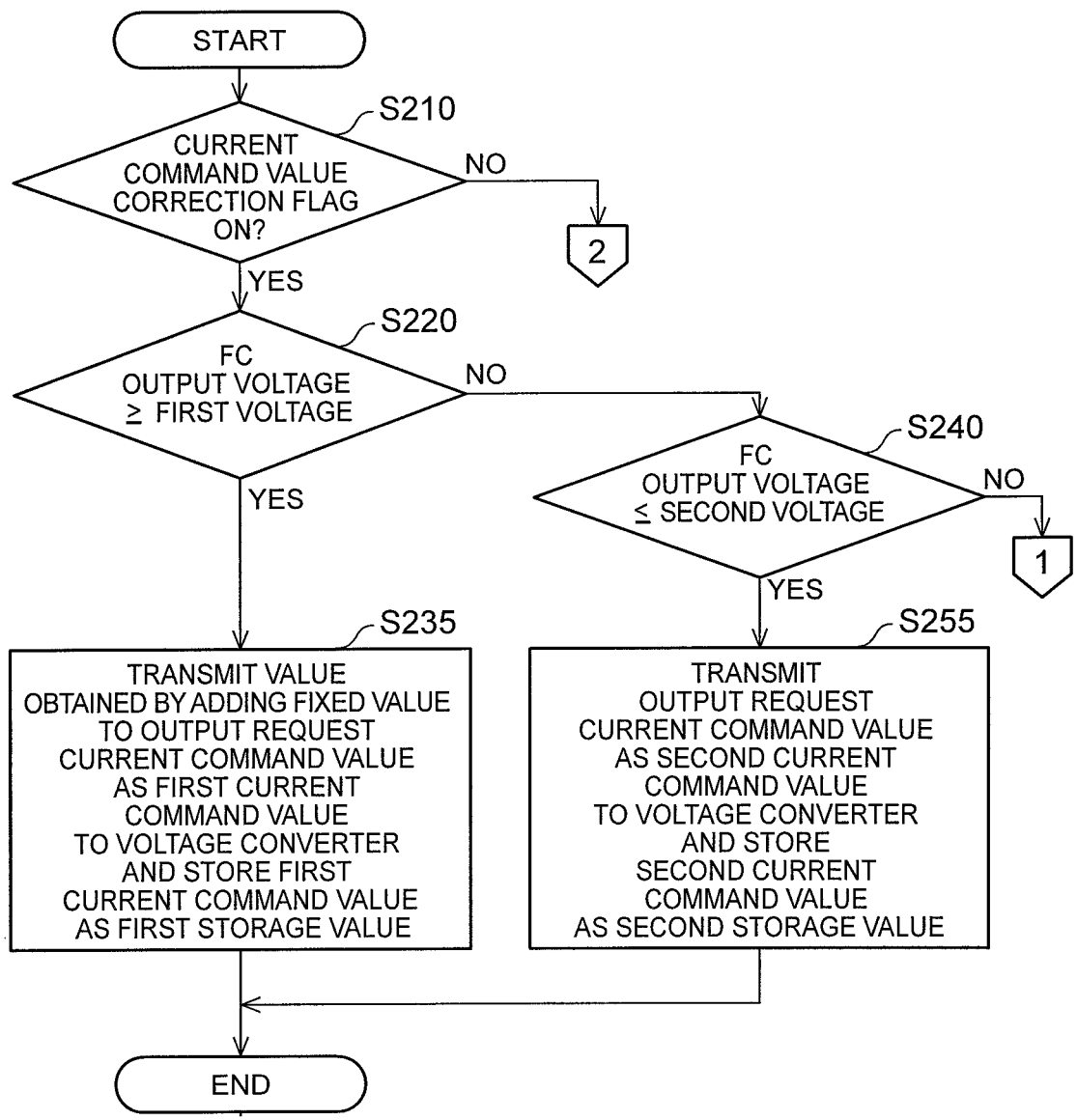
FIG. 4 is an exemplified flowchart that corresponds to FIG. 3 in the case where first and second storage values are unavailable.

FIG. 4 is a flowchart that exemplifies details of the current command value correction processing in the case where the first storage value and the second storage value are not stored in advance, and corresponds to FIG. 3. In FIG. 4, step S260 in the flowchart shown in FIG. 3 is eliminated, step S230 is replaced with step S235, and step S250 is replaced with step S255. Note that the current command value correction processing shown in FIG. 4 is terminated once the first storage value and the second storage value are stored.

In step S235, the control section 300 transmits a value that is obtained by adding a predetermined fixed value to the output request current command value as the first current command value to the fuel cell converter 110, and stores the first current command value as the first storage value. The "predetermined fixed value" is a value that is used to set the first current command value in the case where the first storage value is not stored in advance. For example, as the predetermined fixed value, a value that is obtained by subtracting the output request current command value from the current command value corresponding to the first voltage can be adopted. In step S255, the control section 300 transmits the output request current command value as the second current command value to the fuel cell converter 110 and stores the second current command value as the second storage value. Note that the current command value correction processing shown in FIG. 4 may be eliminated.

Figure 5:
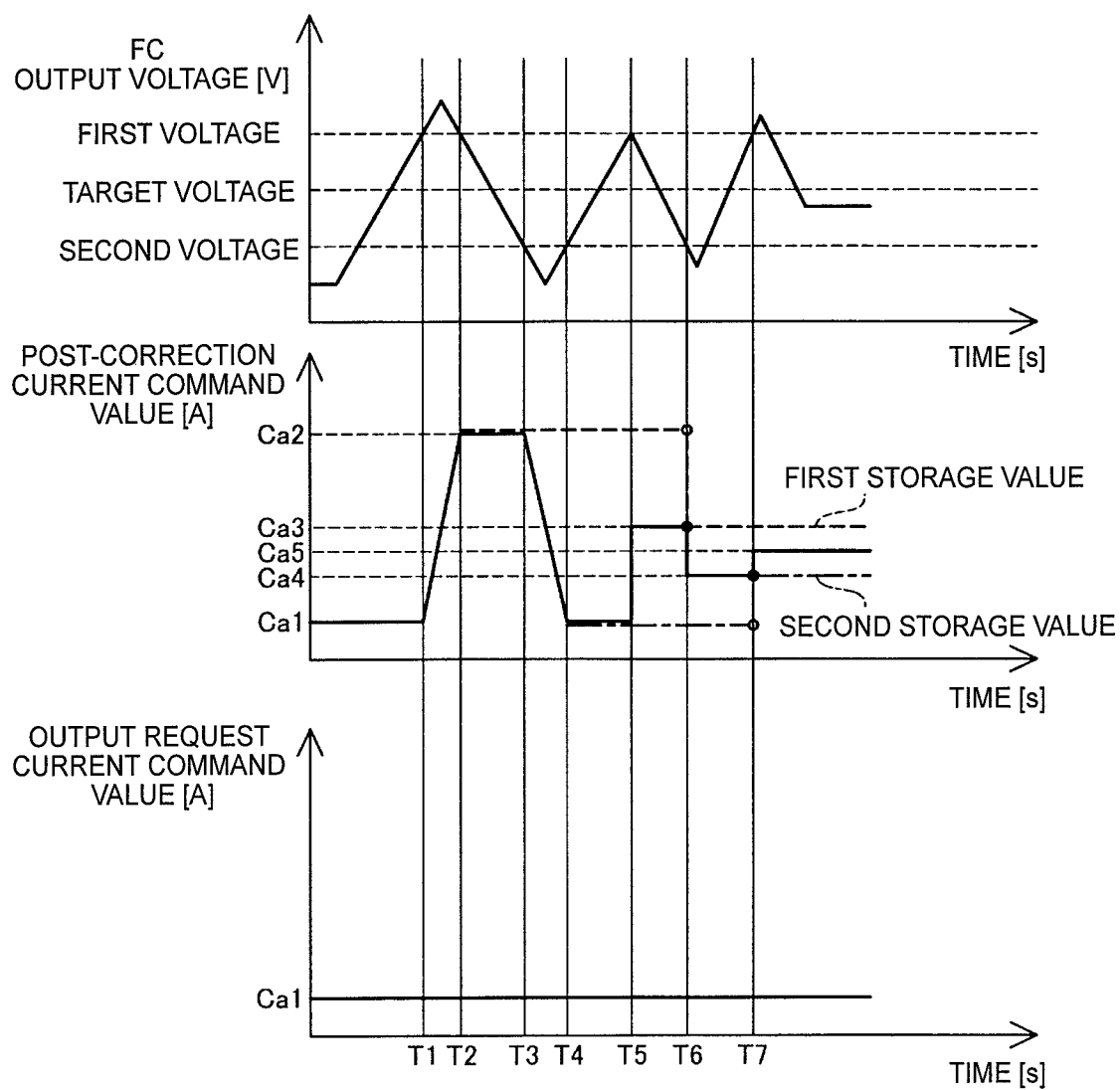
FIG. 5 includes graphs that exemplify temporal changes of a FC output voltage, a post-correction current command value, and the output request current command value in the embodiment.
Figure 6:
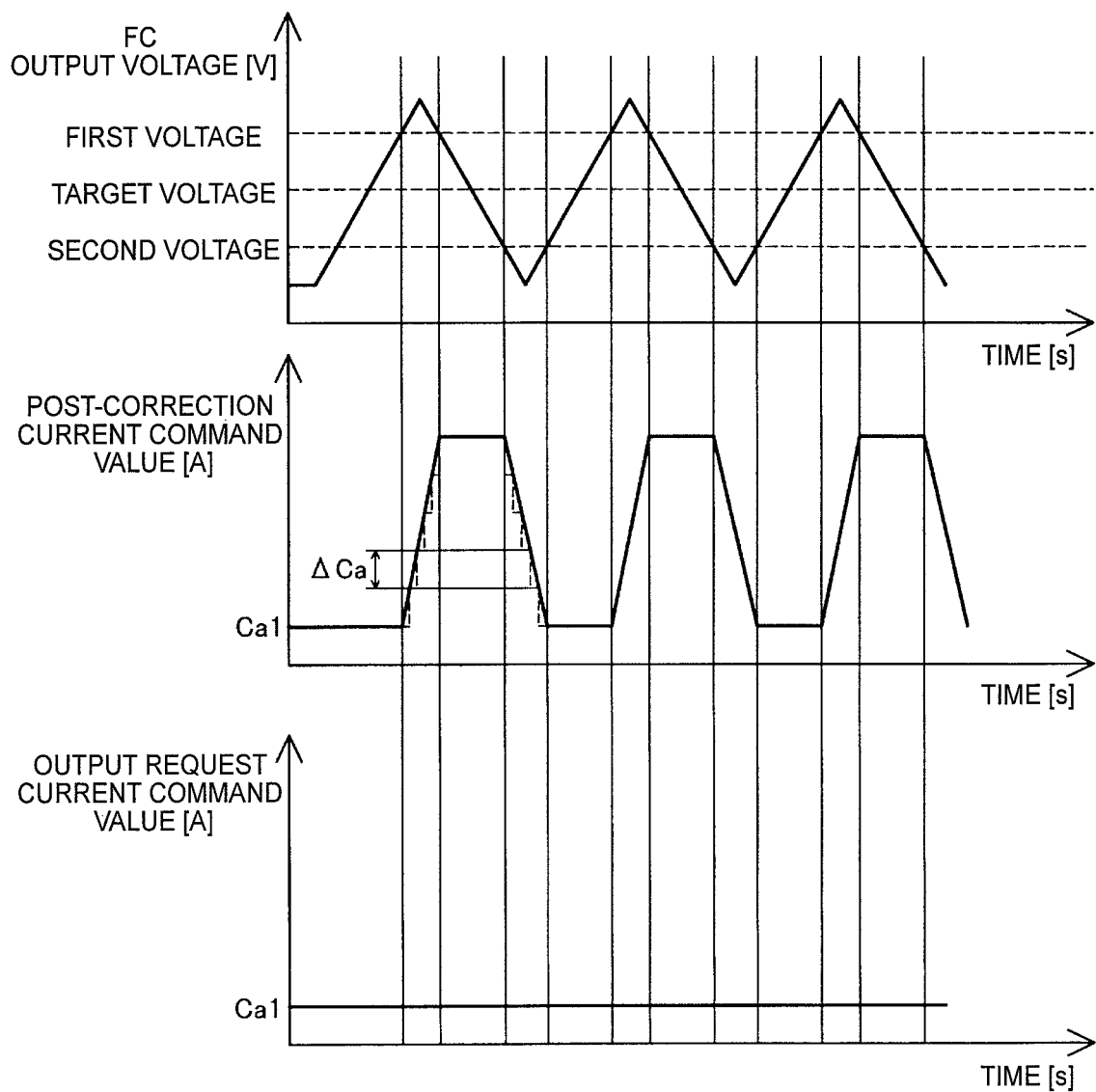
FIG. 6 includes graphs that exemplify temporal changes of a FC output voltage, a post-correction current command value, and an output request current command value in the related art.

FIG. 5 includes graphs that exemplify temporal changes of the output voltage (referred to as a "FC output voltage" in FIG. 5), the post-correction current command value, and the output request current command value at the time when output voltage of the fuel cell stack 100 is regulated. FIG. 5 shows graphs in the case where the current command value correction flag is on (Yes in step S210 in FIG. 3). Note that, in an example shown in FIG. 5, as the current command value that falls between the first storage value and the second storage value, that is, as the post-correction current command value, the arithmetic mean of the first storage value and the second storage value is adopted.

At time T1, the FC output voltage becomes equal to or higher than the first voltage (Yes in step S220 in FIG. 4). At this time, since the first storage value is not stored in advance, the control section 300 follows the processing procedure shown in FIG. 4. The control section 300 transmits the value that is obtained by adding the predetermined fixed value to the output request current command value as the first current command value (the post-correction current command value) to the fuel cell converter 110, and stores the first current command value as the first storage value (step S235 in FIG. 4). In the example shown in FIG. 4, the control section 300 transmits a value Ca2 that is obtained by adding the fixed value to an output request current command value Ca1 as the post-correction current command value to the fuel cell converter 110. More specifically, the control section 300 gradually increases the post-correction current command value from Ca1 to Ca2 in a period from the time T1 to time T2. However, instead of gradually increasing the post-correction current command value, the control section 300 may increase the post-correction current command value to the post-correction current command value Ca2 at once. In the period from the time T1 to the time T2, along with the increase in the post-correction current command value, an increase in the FC output voltage is stopped, and the FC output voltage starts being lowered. At the time T2, the control section 300 stores the post-correction current command value Ca2 as the first storage value. In a period from the time T2 to time T3, the FC output voltage keeps being lowered and is lower than the first voltage and higher than the second voltage. Accordingly, the post-correction current command value maintains the value at the time T2 (step S270 in FIG. 3).

At the time T3, the FC output voltage becomes equal to or lower than the second voltage (Yes in step S240 in FIG. 4). At this time, since the second storage value is not stored in advance, the control section 300 follows the processing procedure shown in FIG. 4. The control section 300 transmits the output request current command value as the second current command value (the post-correction current command value) to the fuel cell converter 110, and stores the second current command value as the second storage value (step S255 in FIG. 4). In the example shown in FIG. 4, the control section 300 transmits the output request current command value Ca1 as the post-correction current command value to the fuel cell converter 110. More specifically, the control section 300 gradually lowers the post-correction current command value from Ca2 to Ca1 in a period from the time T3 to time T4. However, instead of gradually lowering the post-correction current command value, the control section 300 may lower the post-correction current command value to the post-correction current command value Ca1 at once. In the period from the time T3 to the time T4, along with lowering of the post-correction current command value, lowering of the FC output voltage is stopped, and the FC output voltage starts being increased. At the time T4, the control section 300 stores the post-correction current command value Ca1 as the second storage value. In a period from the time T4 to time T5, the FC output voltage keeps being increased and is lower than the first voltage and higher than the second voltage. Accordingly, the post-correction current command value maintains the value at the time T4 (step S270 in FIG. 3).

At the time T5, the FC output voltage becomes equal to or higher than the first voltage (Yes in step S220 in FIG. 4). At the time T5 onward, since the first storage value and the second storage value are already stored, the control section 300 follows the processing procedure shown in FIG. 3. The control section 300 stores the second current command value, that is, the post-correction current command value Ca1 at the time T4 as the second storage value (step S230 in FIG. 3). In conjunction with this, the control section 300 transmits the first storage value at the time T5, that is, an average value Ca3 (the post-correction current command value) between the first storage value Ca2, which is stored at the time T2, and the second storage value Ca1 to the fuel cell converter 110 (step S260 in FIG. 3). The fuel cell converter 110 receives the post-correction current command value Ca3 and then lowers the FC output voltage.

At time T6, the FC output voltage becomes equal to or lower than the second voltage (Yes in step S240 in FIG. 3). At this time, the control section 300 stores the first current command value, that is, the post-correction current command value Ca3 at the time T5 as the first storage value (step S250 in FIG. 3). In conjunction with this, the control section 300 transmits the second storage value at the time T6, that is, an average value Ca4 (the post-correction current command value) between the second storage value Ca1, which is stored at the time T4, and the first storage value Ca3 to the fuel cell converter 110 (step S260 in FIG. 3). The fuel cell converter 110 receives the post-correction current command value Ca4 and then increases the FC output voltage.

At time T7, the FC output voltage becomes equal to or higher than the first voltage (Yes in step S220 in FIG. 3). At this time, the control section 300 stores the second current command value, that is, the post-correction current command value Ca4 at the time T6 as the second storage value (step S230 in FIG. 3). In conjunction with this, the control section 300 transmits the first storage value at the time T7, that is, an average value Ca5 (the post-correction current command value) between the first storage value Ca3, which are stored at the time T6, and the second storage value Ca4 to the fuel cell converter 110 (step S260 in FIG. 3). The fuel cell converter 110 receives the post-correction current command value Ca5 and then lowers the FC output voltage.

At the time T7 onward, the FC output voltage is lower than the first voltage and higher than the second voltage. Accordingly, the post-correction current command value is maintained to the post-correction current command value Ca5 at the time T7 (step S270 in FIG. 3). As it is understood from FIG. 5, the post-correction current command value falls between the first storage value and the second storage value with a lapse of time. In response thereto, the FC output voltage falls between the first voltage and the second voltage. In other words, every time the FC output voltage becomes equal to or higher than the first voltage or becomes equal to or lower than the second voltage, the control section 300 updates the first storage value or the second storage value and transmits the current command value (the post-correction current command value), which is calculated by using the first storage value and the second storage value, to the fuel cell converter 110. In this way, the control section 300 controls the regulation of the output voltage of the fuel cell stack 100 by the fuel cell converter 110. Therefore, hunting of the output voltage can be suppressed.

As it has been described so far, in the embodiment, every time the FC output voltage of the fuel cell stack 100 becomes equal to or higher than the first voltage or becomes equal to or lower than the second voltage, the control section 300 updates the first storage value or the second storage value and transmits the current command value, which is calculated by using the first storage value and the second storage value, as the first current command value or the second current command value to the fuel cell converter 110. In this way, the control section 300 controls the regulation of the output voltage of the fuel cell stack 100 by the fuel cell converter 110. Therefore, hunting of the output voltage can be suppressed.

The disclosure is not limited to the above-described embodiment and can be implemented by having any of various configurations within the scope that does not depart from the gist thereof. For example, technical features in the embodiment that correspond to technical features in the aspects described in SUMMARY can appropriately be replaced or combined to solve a part or the whole of the above-described problem or to achieve some or all of the above-described effects. In addition, when any of those technical features is not described as being essential in this specification, the technical feature(s) can appropriately be eliminated.

What is claimed is:
1. A fuel cell system comprising:
a fuel cell stack;
a voltage detector that detects an output voltage of the fuel cell stack;
a fuel cell converter that regulates the output voltage; and
a control section that is configured to: transmit a first current command value used to lower the output voltage to the fuel cell converter in a case where the output voltage becomes equal to or higher than a first voltage that is an upper limit of an output voltage range; transmit a second current command value used to boost the output voltage to the fuel cell converter in a case where the output voltage becomes equal to or lower than a second voltage that is a lower limit of the output voltage range; store the first current command value as a first storage value in the case where the output voltage becomes equal to or lower than the second voltage; store the second current command value as a second storage value in the case where the output voltage becomes equal to or higher than the first voltage; and transmit the current command value as the first current command value or the second current command value to the fuel cell converter, the current command value being calculated by using the first storage value and the second storage value and falling between the first storage value and the second storage value.

2. The fuel cell system according to claim 1, wherein the control section is further configured to: transmit a value that is obtained by adding a predetermined fixed value to an output request current command value corresponding to an output request for the fuel cell stack as the first current command value to the fuel cell converter and store the first current command value as the first storage value in a case where the first storage value is not stored in advance and the output voltage becomes equal to or higher than the first voltage; and transmit the output request current command value as the second current command value to the fuel cell converter and store the second current command value as the second storage value in a case where the second storage value is not stored in advance and the output voltage becomes equal to or lower than the second voltage.

3. The fuel cell system according to claim 1, wherein the control section is further configured to transmit a last transmitted current command value to the fuel cell converter in a case where the output voltage is lower than the first voltage and higher than the second voltage.

4. The fuel cell system according to claim 1, wherein the current command value that falls between the first storage value and the second storage value is an average value between the first storage value and the second storage value.

5. A vehicle comprising:
the fuel cell system according to claim 1; and
a motor that drives the vehicle, the motor rotating by electricity generated by the fuel cell stack.

* * * * *